United States Patent
Krahn (10) Patent No.: US 9,200,645 B2
(45) Date of Patent: Dec. 1, 2015

(54) STEERING CONTROL UNIT AND ELECTRO-HYDRAULIC STEERING LOAD SENSE CONTROL

(71) Applicant: Eaton Corporation, Cleveland, OH (US)

(72) Inventor: Aaron Kelly Krahn, Eden Prairie, MN (US)

(73) Assignee: Eaton Corporation, Cleveland, OH (US)

( * ) Notice: Subject to any disclaimer, the term of this patent is extended or adjusted under 35 U.S.C. 154(b) by 640 days.

(21) Appl. No.: 13/630,386

(22) Filed: Sep. 28, 2012

(65) Prior Publication Data
US 2013/0087209 A1    Apr. 11, 2013

Related U.S. Application Data (60) Provisional application No. 61/541,697, filed on Sep. 30, 2011.

(51) Int. Cl.
| | | |
|---|---|---|
| *F15B 9/08* | (2006.01) | |
| *B62D 5/09* | (2006.01) | |
| *B62D 1/22* | (2006.01) | |

(52) U.S. Cl.
CPC ... *F15B 9/08* (2013.01); *B62D 1/22* (2013.01); *B62D 5/09* (2013.01); *F15B 2211/30565* (2013.01); *F15B 2211/324* (2013.01); *F15B 2211/329* (2013.01); *F15B 2211/605* (2013.01); *F15B 2211/61* (2013.01); *Y10T 137/0324* (2015.04); *Y10T 137/7722* (2015.04)

(58) Field of Classification Search
CPC .. F15B 9/08; F15B 2211/30565; F15B 9/324; F15B 9/329; F15B 9/605; F15B 9/61; F15B 9/8757; B62D 1/22; B62D 5/09; Y10T 137/0324; Y10T 137/7722; Y10T 137/86493; Y10T 137/2514
USPC ............... 60/384, 385, 386, 420; 91/6, 32, 33
See application file for complete search history.

(56) References Cited

U.S. PATENT DOCUMENTS

| | | | |
|---|---|---|---|
| 7,980,354 | B2 | 7/2011 | Thomsen et al. |
| 7,984,785 | B2 | 7/2011 | Cadman et al. |
| 2009/0218161 | A1 | 9/2009 | Cadman et al. |

OTHER PUBLICATIONS

International Search Report and Written Opinion for PCT/US2012/057937 mailed Apr. 10, 2014.
Load Sensing Systems Principle of Operation, Medium Duty Piston Pumps, No. 03-206, Eaton Corporation, 28 pages (Nov. 1992).
Novacek, W., Load-Sensing Steering—Analysis and Application, Eaton Corporation, 8 pages (Reprint Jul. 1985).

*Primary Examiner* — Dwayne J White
*Assistant Examiner* — Logan Kraft
(74) *Attorney, Agent, or Firm* — Merchant & Gould P.C.

(57) ABSTRACT

An aspect of the present disclosure relates to a steering system having first and second steering circuits in fluid communication with a fluid actuator wherein the steering circuits are disposed in parallel to each other. The second steering circuit includes a proportional valve having a load-sense feature in selective fluid communication with a load-sense connection and the first steering circuit. The load-sense feature is open to the first steering circuit when the proportional valve is in a neutral position and closed to the first steering circuit when the proportional valve is moved to a first or second steering position. When the proportional valve is actuated from the neutral position to the first or second steering position the movement of the proportional valve closes the load sense feature from the first steering circuit and operates to deactivate the first steering circuit.

21 Claims, 6 Drawing Sheets

STEERING CONTROL UNIT AND ELECTRO-HYDRAULIC STEERING LOAD SENSE CONTROL

CROSS REFERENCE TO RELATED APPLICATIONS

This application claims the benefit of U.S. Provisional Application No. 61/541,697, filed Sep. 30, 2011, and titled "Steering Control Unit and Electro-Hydraulic Steering Load Sense Control," the disclosure of which is hereby incorporated herein by reference.

BACKGROUND

In many "off-highway" vehicles, such as tractors, loaders, line painting vehicles, sweepers, pavers, marine vehicles, etc., parallel steering circuits are used to control an actuator that steers the vehicle. In some applications, one of the parallel steering circuits is manually actuated using a steering wheel and another is actuated through an automation system. In some applications, both of the steering circuits are manually actuated. In some applications, a load sense circuit is utilized to improve performance and to save system pumping energy.

SUMMARY

An aspect of the present disclosure relates to a steering system having a fluid actuator, a first steering circuit in selective fluid communication with the fluid actuator, and a second steering circuit in selective fluid communication with the fluid actuator and disposed in parallel to the first steering circuit. The second steering circuit includes a proportional valve having a load-sense feature in selective fluid communication with a load-sense connection and the first steering circuit. The load-sense connection is open to the first steering circuit when the proportional valve is in a neutral position and closed to the first steering circuit when the proportional valve is moved to a first or second steering position. When the proportional valve is actuated from the neutral position to the first or second steering position the movement of the proportional valve closes the load-sense connection from the first steering circuit and operates to deactivate the first steering circuit. In one embodiment, the first steering circuit is an electro-hydraulic steering circuit and the second steering circuit is a hydrostatic steering circuit.

Another aspect of the present disclosure relates to a steering system having a first steering circuit in selective fluid communication with a fluid actuator. The first steering circuit defines a first flow path and includes a first proportional valve disposed in the first flow path. The steering system further includes a second steering circuit in selective fluid communication with the fluid actuator. The second steering circuit defines a second flow path that is in a parallel flow configuration with the first flow path of the first steering circuit. The second steering circuit includes a second proportional valve and an isolation valve. The second proportional valve includes a neutral position that is adapted to enable fluid communication between a load-sense connection and the first steering circuit through the operation of an integral load-sense feature.

Another aspect of the present disclosure relates to a steering system comprising first and second steering circuits in selective fluid communication with a fluid actuator wherein the second steering circuit is arranged in parallel relation to the first steering circuit. The second steering circuit comprises a proportional valve having a load-sense feature in selective fluid communication with a load-sense connection and the first steering circuit wherein the load-sense connection is open to the first steering circuit when the proportional valve is in a neutral position; and is closed to the first steering circuit by movement of the proportional valve to a first or second steering position.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
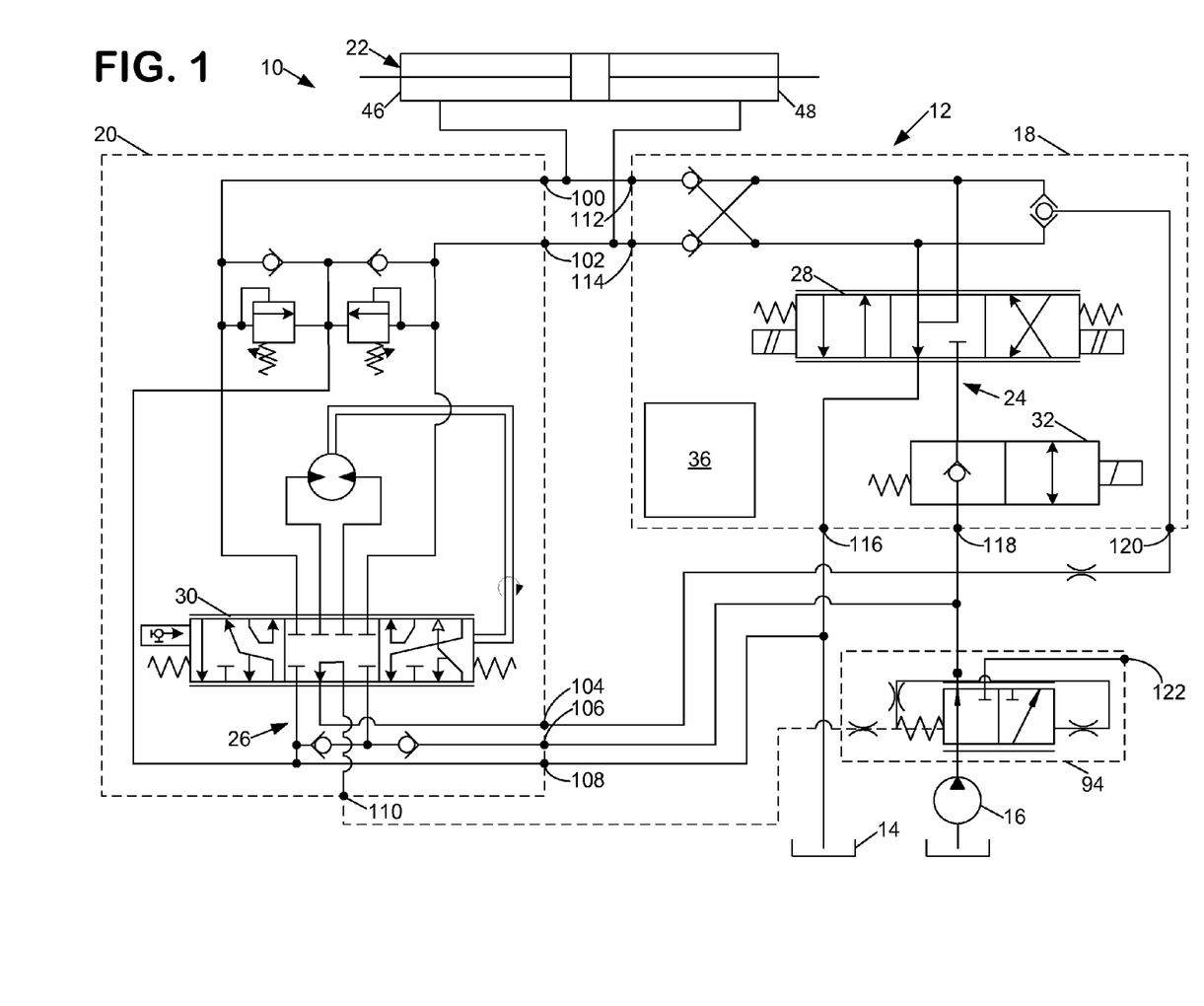
FIG. 1 is a hydraulic schematic of a steering system having features that are examples of aspects in accordance with the principles of the present disclosure.

Referring now to FIG. 1, a hydraulic schematic of a steering system, generally designated 10, for an off-highway vehicle (e.g., combine, loader, tractor, paver, line painter, sweeper, marine vehicle, etc.) is shown. The steering system 10 includes a steering circuit, generally designated 12, having a reservoir 14, a pump 16 having an inlet in fluid communication with the reservoir 14, and a priority valve 94. As shown, pump 16 is a constant volume pump. Priority valves, such as valve 94, are well known in the prior art, and operate to ensure that the pressure delivered to the steering circuit 12 is both prioritized and at the desired pressure for efficient operation through a load-sense circuit. In the embodiment shown, the priority valve is connected to the load-sense connection 110 of the steering circuit 12. Excess flow from the pump 16 not needed for the operation of steering circuit 12 is directed to port 122 where it can serve other functions of the vehicle. Instead of a constant volume pump and priority valve combination, a pressure compensated pump could also be utilized.

The steering circuit 12 further includes an electro-hydraulic steering circuit, generally designated 18, and a hydrostatic steering circuit, generally designated 20. Each of the electro-hydraulic steering circuit 18 and the hydrostatic steering circuit 20 provide selective fluid communication between the pump 16 and a fluid actuator 22. While the fluid actuator 22 is shown in FIG. 1 as being a single fluid actuator, it will be understood that the term "fluid actuator" in the specification and the claims includes at least one fluid actuator.

The electro-hydraulic steering circuit 18 defines a first flow path 24 while the hydrostatic steering circuit 20 defines a second flow path 26. The first flow path 24 of the electro-hydraulic steering circuit 18 is disposed in a parallel flow configuration with the second flow path 26 of the hydrostatic steering circuit 20. In the subject embodiment, the electro-hydraulic steering circuit 18 includes a first proportional valve 28 for selectively communicating fluid from the pump 16 to the fluid actuator 22 through the first flow path 24 while the second flow path 26 includes a second proportional valve 30 for selectively communicating fluid from the pump 16 to the fluid actuator 22 through the second flow path 26.

Figure 2:
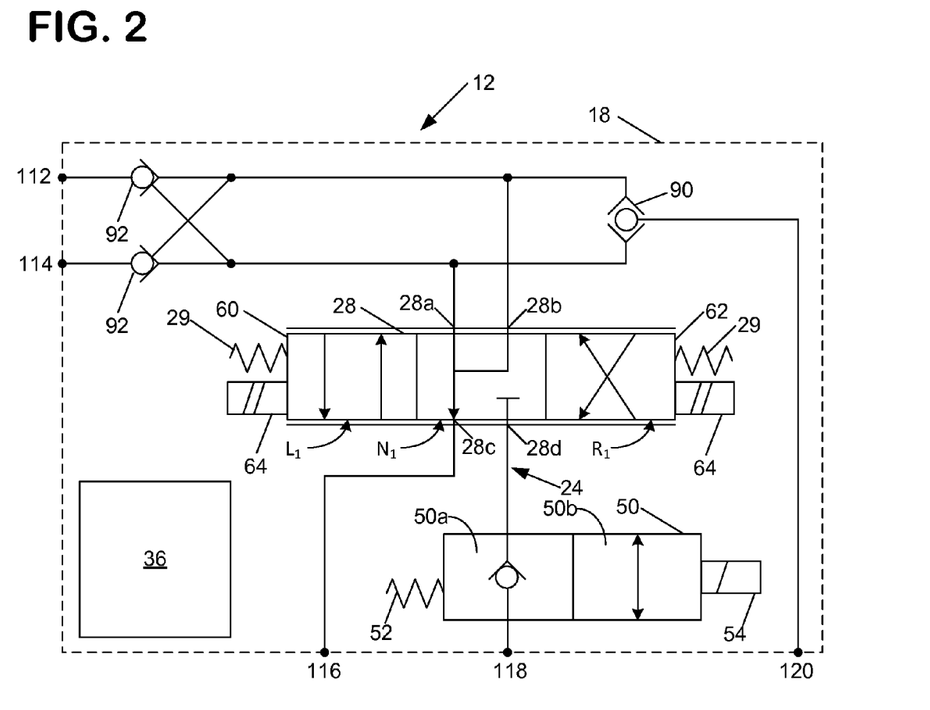
FIG. 2 is a hydraulic schematic of an hydraulic steering circuit suitable for use with the steering system of FIG. 1.

Referring now to FIGS. 1 and 2, the electro-hydraulic steering circuit 18 is shown. The electro-hydraulic steering circuit 18 is shown as including a proportional control valve 28, an isolation valve assembly 50, a microcontroller 36, a shuttle valve assembly 90, and a pair of cross-over pilot operated check valves 92. The individual components may be integrated into a single valve assembly, or provided as separate components. One skilled in the art will appreciate that varying combinations of components and configurations can be utilized without departing from the inventive concepts presented herein.

In the subject embodiment, the electro-hydraulic steering circuit 18 defines an inlet 118 in fluid communication with the pump 16, an outlet 116 in fluid communication with the reservoir 14, a first actuator outlet 112 and a second actuator outlet 114. The first and second actuator outlets 112, 114 are in fluid communication with a first end 46 (shown in FIG. 1) and an oppositely disposed second end 48 (shown in FIG. 1), respectively, of the fluid actuator 22.

The electro-hydraulic steering circuit 18 defines the first flow path 24 from the inlet 118 to the first and second actuator outlets 112, 114. As shown, the first proportional valve 28 is disposed in the first flow path 24 between the inlet 118 and the first and second actuator outlets 112, 114. In the subject embodiment, and by way of example only, the first proportional valve 28 is a three-position, four-way valve having ports 28a, 28b, 28c, and 28d. In the embodiment shown, port 28a is in fluid communication with outlet 114 and shuttle valve 90, port 28b is in fluid communication with outlet 112 and shuttle valve 90, port 28c is in fluid communication with outlet 116, and port 28d is in fluid communication with outlet 118. The first proportional valve 28 includes a neutral position $N_1$, a right turn position $R_1$, and a left turn position $L_1$.

In the subject embodiment, the neutral position $N_1$ is a closed position. It will be understood that the term "closed position" refers to a position in which fluid communication between the inlet 118 and one of the first and second outlets 112, 114 is blocked by the valve 28. In other words, with the first proportional valve 28 in the neutral position $N_1$, fluid from the pump 16 cannot be communicated through the first flow path 24 to the fluid actuator 22 via the first and second actuator outlets 112, 114. In the exemplary embodiment shown in FIG. 2, ports 28a, 28b, and 28c are in fluid communication with each other while port 28d is blocked when the first proportional valve 28 is in the neutral position $N_1$.

In the subject embodiment, the left turn position $L_1$ places ports 28b and 28d in fluid communication with each other and also places ports 28a and 28c in fluid communication with each other. This position allows for pumped fluid to be communicated from pump 16 to the first end 46 of fluid actuator 22 via outlet 112, ports 28b and 28d, and outlet 118, and then returned to the reservoir 14 via outlet 114, ports 28a and 28c, and outlet 116.

In the subject embodiment, the right turn position $R_1$ places ports 28a and 28d in fluid communication with each other and also places ports 28b and 28c in fluid communication with each other. This position allows for pumped fluid to be communicated from pump 16 to the second end 48 of fluid actuator 22 via outlet 114, ports 28a and 28d, and outlet 118, and then returned to the reservoir 14 via outlet 112, ports 28b and 28c, and outlet 116.

In the subject embodiment, the first proportional valve 28 is held in the neutral position $N_1$ by a pair of centering springs 29. The first proportional valve 28 is moved towards the right turn position $R_1$ and the left turn position $L_1$ through the operation of a pair of electromagnetic actuators 64. In the subject embodiment, the electromagnetic actuators 64 are proportionally controlled voice coils. Alternatively, pilot operated actuators can be used in the place of electromagnetic actuators 64. If a signal is supplied to the first end 60 of the first proportional valve 28, the first proportional valve 28 is actuated to the left turn position $L_1$. If a signal is supplied to the second end 62 of the first proportional valve 28, the first proportional valve 28 is actuated to the right turn position $R_1$.

To actuate the first proportional valve 28, a signal, such as a pulse width modulation (PWM) voltage, is supplied from the microcontroller 36 to either one of electromagnetic actuators 64, depending upon the desired valve position. In one aspect of the present disclosure, the microcontroller 36 receives information from a Global Positioning System (GPS) receiver related to the location, direction, and speed of the vehicle. The microcontroller 36 then transmits signals to the electromagnetic actuators 64 in order to control the position of the first proportional valve 28. Alternatively, the microcontroller can transmit signals to the electromagnetic actuators 64 based on other types of signals, such as a signal from a joystick.

Electro-hydraulic circuit 18 is shown as including an isolation valve 50. Isolation valve 50 is for isolating the proportional control valve 30 when it is desired to have the electro-hydraulic circuit 18 deactivated or to not interact with the remainder of the system 10. In the embodiment shown, isolation valve is movable to an open position 50b from a closed check position 50a. The isolation valve 50 can be pilot actuated or can be an electromagnetic actuator. In the embodiment shown, the isolation valve 50 includes a solenoid type electromagnetic actuator 54 configured to receive signals from controller 36. A spring 52 is provided to bias the isolation valve 50 into the closed check position 50a when power is not provided to the actuator 54. In this position, pressure from pump 16 is unable to provide a pressure to either of outlets 112 and 114. When it is desired to control the steering system 10 with steering circuit 18, the isolation valve 50 is moved into the open position 50b.

Also shown as being part of electro-hydraulic circuit 18 is shuttle valve 90. Shuttle valve 90 is for communicating the higher pressure of outlet 112 and 114 to a load sense circuit port 120. The load sense circuit allows for the pump 16 to be modulated to match the system pressure requirements to increase system efficiency and performance. When the first proportional valve 28 is in the neutral position $N_1$, both sides of the shuttle valve 90, to which the load sense circuit is connected, are placed in fluid communication with the reservoir 14.

Electro-hydraulic circuit 18 is also shown as including a pair of cross-over pilot operated check valves 92 in fluid communication with outlets 112 and 114. These valves always allow flow to pass through them in a direction from valve 28 towards outlets 112 and 114. Additionally, the valves 92 prevent flow in the reverse direction unless pressure is sensed in the opposite line to which the pilot is connected. This configuration prevents flow in this direction when the electro-hydraulic circuit 18 is deactivated and not under pressure while allowing for reverse flow to occur when the electro-hydraulic circuit 18 is activated. When the first proportional valve 28 is in the neutral position $N_1$, the lines between the cross-over check valves 92 and the shuttle valve 90 are placed in fluid communication with the reservoir 14 such that the requisite pressure to open and permit reverse flow through the valves 92 does not exist.

Figure 3:
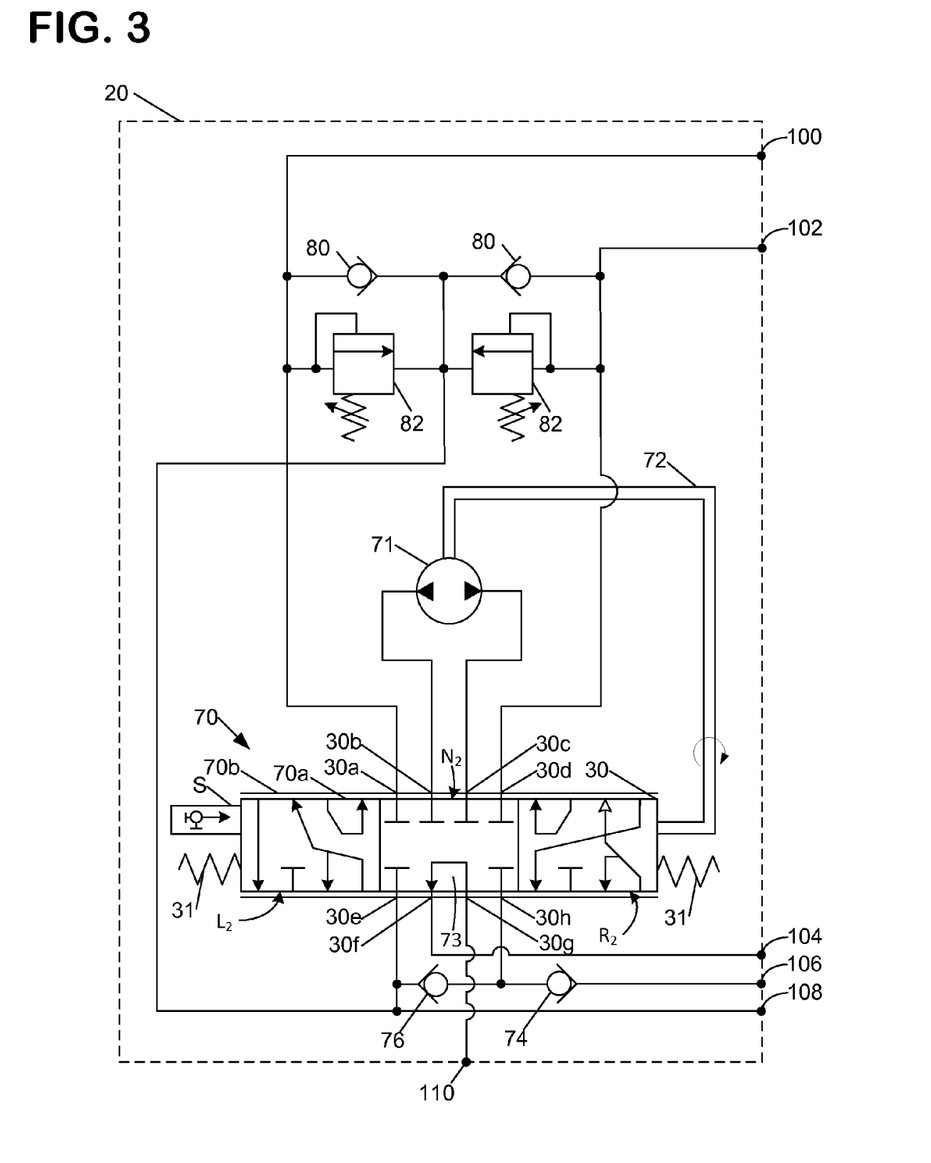
FIG. 3 is an electro-hydraulic schematic of a fluid controller suitable for use with the steering system of FIG. 1.

Referring now to FIG. 3, the hydrostatic steering circuit 20 is shown in further detail. The hydrostatic steering circuit 20 includes the second proportional valve 30 and defines a fluid inlet port 106 in fluid communication with the pump 16, a fluid outlet port 108 in fluid communication with the reservoir 14, a first control port 100, and a second control port 102. The first and second control ports 100, 102 are in fluid communication with the first and second ends 46, 48, respectively, of the fluid actuator 22 (shown in FIG. 1). The second proportional valve 30 is disposed between the fluid inlet port 106 and the first and second control ports 100, 102.

Figure 4:
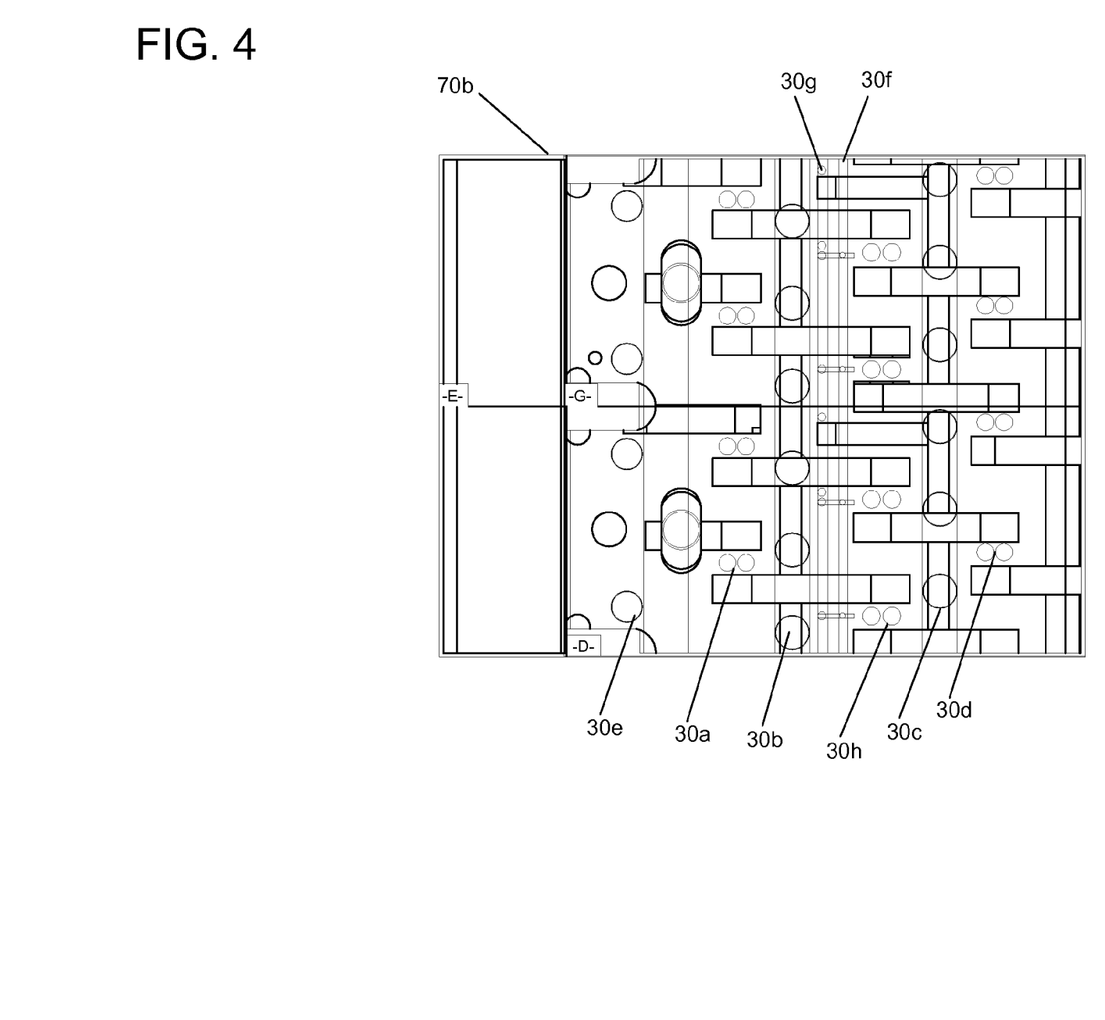
FIG. 4 is a flat overlay of a spool and sleeve assembly suitable for use with the steering system of FIG. 1.
Figure 5:
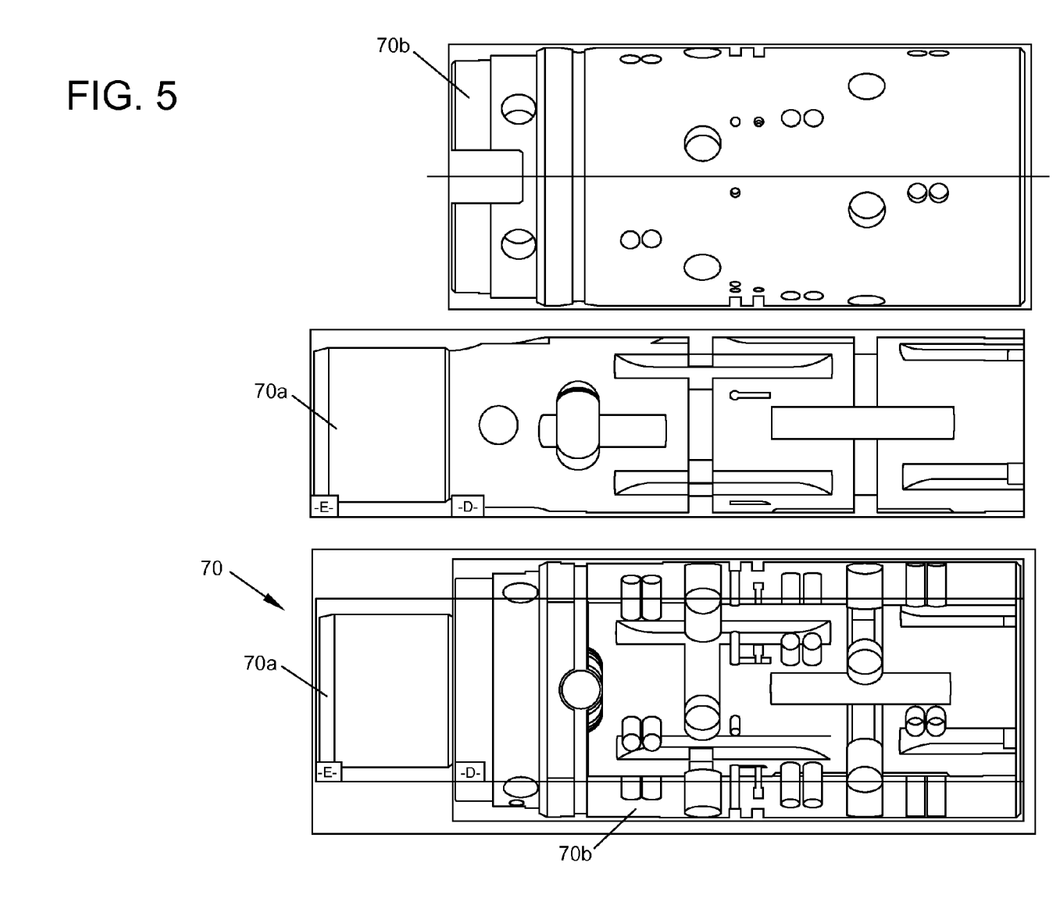
FIG. 5 is shows a spool and sleeve configuration suitable for use with the steering system of FIG. 1.
Figure 6:
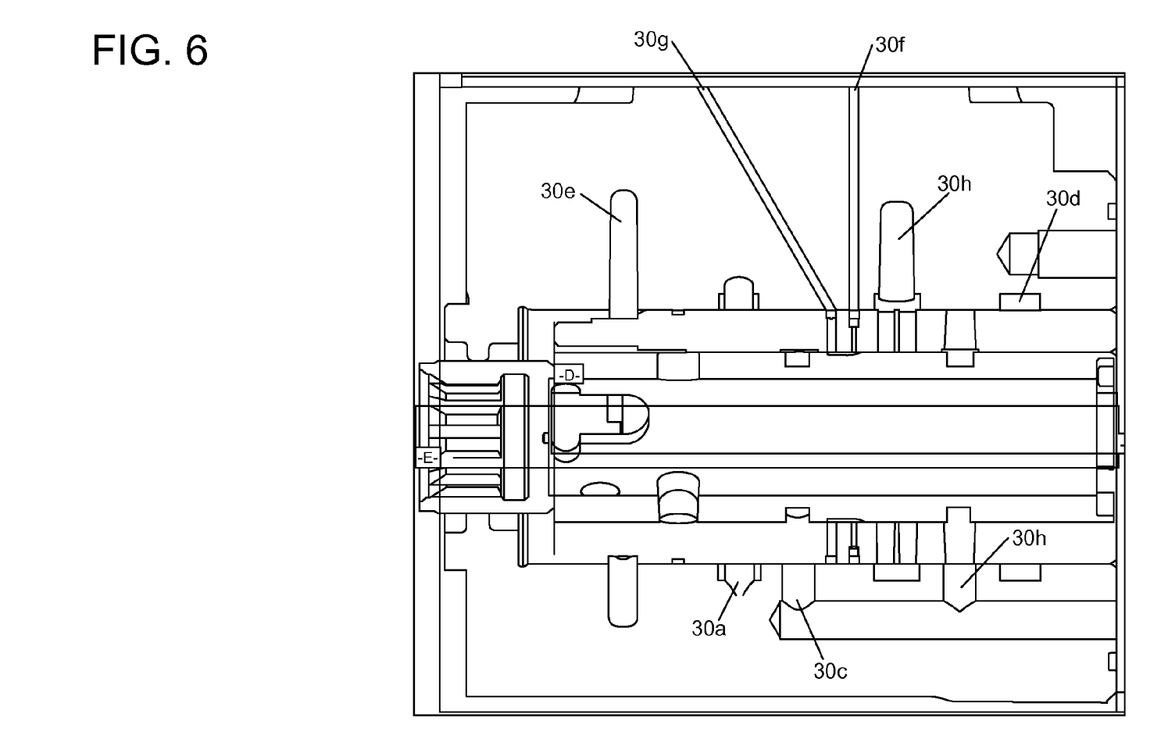
FIG. 6 is shows a spool, sleeve and housing configuration suitable for use with the steering system of FIG. 1.

In the subject embodiment, the second proportional valve 30 includes a valving assembly 70 having a rotary valve 70a (e.g., spool) and a follow-up valve member 70b (e.g., sleeve). In the subject embodiment, the spool rotates within a bore of the sleeve as a result of manual actuation of a steering actuation member S (e.g., a steering wheel, a joystick, etc.). FIGS. 4-6 show the proportional valve 30 in further detail, and in an actual physical configuration.

The second proportional valve 30 is movable from a neutral position $N_2$ to a right turn position $R_2$ or a left turn position $L_2$ through the manual actuation of the steering actuation member S. In the subject embodiment, valve 30 is a three-position, eight-way valve having ports 30a, 30b, 30c, 30d, 30e, 30f, 30g, and 30h. In the embodiment shown, port 30a is in fluid communication with control port 100, ports 30b and 30c are in fluid communication with fluid meter 71, port 30d is in fluid communication with control port 102, port 30e is in fluid communication with reservoir 14 via outlet 108, port 30f is in fluid communication with shuttle valve 90 via outlets 104 and 120, port 30g is in fluid communication with load sense connection 110, and port 30h is in fluid communication with pump 16 via outlet 106.

The first proportional valve 28 includes a neutral position $N_1$, a right turn position $R_1$, and a left turn position $L_1$. With the second proportional valve 30 in the right turn position $R_2$ or the left turn position $L_2$, fluid is communicated from the pump 16 to one of the first and second ends 46, 48 of the fluid actuator 22 through a fluid meter 71 (e.g., a gerotor gear set), as explained in further detail in the following paragraphs.

In the subject embodiment, the neutral position $N_2$ is a closed position. It will be understood that the term "closed position" refers to a position in which fluid communication between the inlet 106 and one of the first and second control ports 100, 102 is blocked by the valve 30. In other words, with the second proportional valve 30 in the neutral position $N_2$, fluid from the pump 16 cannot be communicated through the second flow path 26 to the fluid actuator 22 via the control ports 100, 102. In the exemplary embodiment shown in FIG. 3, ports 30a, 30b, 30c, 30d, 30e, and 30g are blocked while ports 30f and 30g are placed in fluid communication with each other. This position allows for the load-sense connection 110 to be in fluid communication with the shuttle valve 90, and in fluid communication with the reservoir 14 when both valves are in the neutral position, such that the load sense circuit is operative for the electro-hydraulic steering circuit 18.

In the subject embodiment, the left turn position $L_2$ disconnects the load-sense circuit from the electro-hydraulic steering circuit 18 by blocking off port 30f while placing the hydrostatic steering circuit 12 in fluid communication with the load-sense circuit via connection 110 by placing port 30g in fluid communication with ports 30h and 30b. Pumped fluid is provided to the first end 46 of fluid actuator 22 via control port 102 and fluid meter 71 by placing port 30h in fluid communication with 30b and by placing ports 30c and 30d in fluid communication with each other. Fluid is returned to the reservoir 14 by placing ports 30a and 30e in fluid communication with each other.

In the subject embodiment, the right turn position $R_2$ disconnects the load-sense circuit from the electro-hydraulic steering circuit 18 by blocking off port 30f while placing the hydrostatic steering circuit 12 in fluid communication with the load-sense circuit via connection 110 by placing port 30g in fluid communication with ports 30h and 30c. Pumped fluid is provided to the second end 48 of fluid actuator 22 via control port 100 and fluid meter 71 by placing port 30h in fluid communication with port 30c and by placing ports 30a and 30b in fluid communication with each other. Fluid is returned to the reservoir 14 by placing ports 30d and 30e in fluid communication with each other.

In the subject embodiment, the fluid meter 71 is dual functional. The fluid meter 71 functions as a metering device that measures the proper amount of fluid to be fed to the appropriate control port 100, 102 of the steering circuit 20 in response to rotation of the steering actuation member S. The fluid meter 71 also functions as a follow-up device that provides follow-up movement to the valving assembly 70 such that the valving assembly 70 is returned to the neutral position $N_2$ after the desired amount of fluid has been directed through the fluid meter 71 to the fluid actuator 22. In the subject embodiment, this follow-up movement is achieved by a mechanical link 72 (e.g., a drive, etc.) that connects the fluid meter 71 to the valving assembly 70.

The fluid controller 20 includes a load-sense feature 73. It will be understood that the term "load-sense feature" as used in the specification and the claims of the present disclosure is defined as a feature in which the load-sense circuit, via connection 110, is open to the electro-hydraulic steering circuit 18 when the second proportional valve 30 is in the neutral position $N_2$. With the second proportional valve 30 in the neutral position $N_2$, fluid in the load-sense circuit is in fluid communication with the shuttle valve 90 of the second proportional valve 30. Therefore, when the electro-hydraulic steering circuit 18 is engaged and in operation, the pump 16 and priority valve 94 operate with the benefit of the load-sense feedback from circuit 18. At any point in time when the second proportional valve 30 is moved from the neutral position $N_2$ to either the right turn position $R_2$ or the left turn position $L_2$, the load-sense feature 73 closes the load-sense connection 110 from the electro-hydraulic steering circuit 18, as previously described. In such an event, the proportional valve 30 provides fluid communication between load-sense circuit connection 110 and the priority valve 94 such that the load-sense circuit operates to ensure that the flow and pressure requirements for the hydrostatic steering circuit 20 are satisfied. Alternatively, where pump 16 is a pressure compensated pump, the load-sense circuit connection 110 is placed in fluid communication with pump 16 instead of a priority valve. When the second proportional valve 30 returns to the neutral position $N_2$, the load-sense circuit connection 110 is then automatically placed back in fluid communication with the electro-hydraulic steering circuit 18.

The above described configuration allows for automatic switching of the load-sense circuit from the electro-hydraulic steering circuit 18 to the hydrostatic steering circuit 20 through simple activation of the steering actuation member S without requiring the use of additional valves or controls. As a result, the hydrostatic steering circuit 20 always has priority over the electro-hydraulic steering circuit 18 in commanding the load sense signal to the priority valve 94. Typical prior art systems require at least one additional load sense switching valve in the load sense circuit to provide for selective communication between circuits 18 and 20. These components decrease the reliability of the system and also present a significant safety issue where a component failure could result in the disabling of the hydrostatic steering circuit 20 even though an operator is attempting to manually override the steering. Furthermore, these additional components increase the cost and complexity of the system and thereby result in a less desirable product.

The hydrostatic steering circuit 20 also includes a pair of check valves 80 to prevent system cavitation and a pair of cylinder relief valves 82 to prevent over-pressurization of the system due to a sudden force exerted on the circuits by the fluid actuator 22. As a safety precaution, the hydrostatic steering circuit 20 also includes a pair of check valves 74, 76 to enable the system to be utilized under conditions where a loss of power may have occurred. Check valve 74 also operates to maintain system performance when sudden pressures from the fluid actuator 22 would otherwise pressure to backflow towards the pump 16.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method for enabling a load-sense feature of a steering system, the method comprising:
   providing a first steering circuit in selective fluid communication with a fluid actuator;
   providing a second steering circuit in selective fluid communication with the fluid actuator, the second steering circuit being in parallel to the first steering circuit, wherein the second steering circuit includes a proportional valve having the load-sense feature, the load-sense feature being a fluid path through the proportional valve, the load-sense feature in selective fluid communication with the first steering circuit, wherein a load-sense connection is open to the first steering circuit when the proportional valve is in a neutral position and wherein the load sense connection is closed to the first steering circuit when the proportional valve is moved to a first or second steering position; and
   closing the load sense connection to the first steering circuit with the load-sense feature by moving the proportional valve to the first or second steering position.

2. The method of claim 1, wherein the first steering circuit comprises at least one electro-hydraulic proportional valve.

3. The method of claim 2, wherein the first steering circuit further comprises a microcontroller to operate the at least one electro-hydraulic proportional valve.

4. The method of claim 2, wherein the second steering circuit proportional valve is a hydrostatic valve.

5. The method of claim 1, wherein the first steering circuit further comprises an isolation valve configured to selectively deactivate the first steering circuit.

6. The method of claim 5, wherein the isolation valve is a solenoid operated valve operated by a microcontroller.

7. The method of claim 1, wherein the second steering system further comprises a pair of check valves configured to prevent system cavitation and a pair of cylinder relief valves configured to prevent over-pressurization of the system by the actuator.

8. A steering system comprising:
   (a) a first steering circuit in selective fluid communication with a fluid actuator;
   (b) a second steering circuit in selective fluid communication with the fluid actuator, the second steering circuit:
      i. being arranged in parallel relation to the first steering circuit,
      ii. comprising a proportional valve having a load-sense feature, the load-sense feature being a path through the proportional valve, the load-sense feature in selective fluid communication with a load-sense connection and the first steering circuit:
         1. the load-sense connection being opened to the first steering circuit by the load sense feature when the proportional valve is in a neutral position; and
         2. the load-sense feature being closed to the first steering circuit by the load sense feature upon movement of the proportional valve to a first or second steering position.

9. The steering system of claim 8, wherein the first steering circuit comprises at least one electro-hydraulic proportional valve.

10. The steering system of claim 9, wherein the first steering circuit further comprises a microcontroller to operate the at least one electro-hydraulic proportional valve.

11. The steering system of claim 9, wherein the second steering circuit proportional valve is a hydrostatic valve.

12. The steering system of claim 8, wherein the first steering circuit further comprises an isolation valve configured to selectively deactivate the first steering circuit.

13. The steering system of claim 12, wherein the isolation valve is a solenoid operated valve operated by a microcontroller.

14. The steering system of claim 8, wherein the second steering system further comprises a pair of check valves configured to prevent system cavitation and a pair of cylinder relief valves configured to prevent over-pressurization of the system by the actuator.

15. A steering system comprising:
   (a) a fluid pump;
   (b) a reservoir;
   (c) a load-sense circuit for controlling the output of the fluid pump;
   (d) a fluid actuator having a first end and a second end;
   (e) a first steering circuit in selective fluid communication with the pump, the reservoir, the load-sense circuit, and the fluid actuator; and
   (f) a second steering circuit arranged in parallel relation to the first steering circuit and in selective fluid communication with the pump, the reservoir, the load-sense circuit, and the fluid actuator, the second steering circuit comprising a proportional valve having first, second, third, fourth, fifth, sixth, seventh, and eighth ports;
   (g) the second steering circuit being movable to:
      i. a neutral position wherein:
         1. the first, second, third, fourth, fifth, and eighth ports are blocked;

2. the sixth and seventh ports are in fluid communication with each other such that the first steering circuit is placed in fluid communication with the load-sense circuit;

ii. a left turn position wherein:
   1. the sixth port is blocked such that the first steering circuit is isolated from the load-sense circuit;
   2. the second, third, fourth, and eighth ports are placed in fluid communication with each other to allow for fluid to flow from the pump to the second end of the fluid actuator;
   3. the seventh port is placed in fluid communication with the second and eighth ports to allow for load-sense operation of the second steering circuit;
   4. the first and fifth ports are placed in fluid communication with each other to allow for fluid to flow from the first end of the fluid actuator to the reservoir;

iii. a right turn position wherein:
   1. the sixth port is blocked such that the first steering circuit is isolated from the load-sense circuit;
   2. the first, second, third, and eighth ports are placed in fluid communication with each other to allow for fluid to flow from the pump to the first end of the fluid actuator;
   3. the seventh port is placed in fluid communication with the third and eighth ports to allow for load-sense operation of the second steering circuit;
   4. the fourth and fifth ports are placed in fluid communication with each other to allow for fluid to flow from the second end of the fluid actuator to the reservoir.

16. The steering system of claim 15, wherein the first steering circuit comprises at least one electro-hydraulic proportional valve.

17. The steering system of claim 16, wherein the first steering circuit further comprises a microcontroller to operate the at least one electro-hydraulic proportional valve.

18. The steering system of claim 16, wherein the second steering circuit proportional valve is a hydrostatic valve.

19. The steering system of claim 15, wherein the first steering circuit further comprises an isolation valve configured to selectively deactivate the first steering circuit.

20. The steering system of claim 19, wherein the isolation valve is a solenoid operated valve operated by a microcontroller.

21. The steering system of claim 15, wherein the second steering system further comprises a pair of check valves configured to prevent system cavitation and a pair of cylinder relief valves configured to prevent over-pressurization of the system by the actuator.

* * * * *